US012751804B2

(12) United States Patent
Snyder

(10) Patent No.: US 12,751,804 B2
(45) Date of Patent: Oct. 6, 2026

(54) DENTAL CLEANING DEVICE

(71) Applicant: Slate Dental, Inc., Spokane, WA (US)

(72) Inventor: Daniel Snyder, Spokane, WA (US)

(73) Assignee: Slate Dental, Inc., Spokane, WA (US)

( * ) Notice: Subject to any disclaimer, the term of this patent is extended or adjusted under 35 U.S.C. 154(b) by 0 days.

(21) Appl. No.: 18/732,032

(22) Filed: Jun. 3, 2024

(65) Prior Publication Data

US 2024/0398526 A1 Dec. 5, 2024

Related U.S. Application Data

(63) Continuation of application No. 17/488,290, filed on Sep. 28, 2021, now Pat. No. 12,023,212.

(60) Provisional application No. 63/084,479, filed on Sep. 28, 2020.

(51) Int. Cl.

*A61C 15/04* (2006.01)
*A46B 9/02* (2006.01)
*A46B 15/00* (2006.01)

(52) U.S. Cl.

CPC ............ *A61C 15/048* (2013.01); *A46B 9/026* (2013.01); *A46B 15/0071* (2013.01); *A61C 15/047* (2013.01); *A46B 2200/108* (2013.01)

(58) Field of Classification Search

USPC .................. 132/323, 329; 433/17, 488, 290; D28/66, 68

See application file for complete search history.

(56) References Cited

U.S. PATENT DOCUMENTS 2,016,597 A 10/1935 Drake
2,981,264 A 4/1961 De
3,368,553 A * 2/1968 Kirby .................. A61C 15/046 433/142
3,999,562 A * 12/1976 Reukauf ................ A61C 15/02 132/329
4,222,143 A 9/1980 Tarrson
4,880,382 A * 11/1989 Moret ................ A46B 15/0075 601/142
4,920,992 A 5/1990 Preciutti
5,170,809 A 12/1992 Imai et al.
5,217,475 A 6/1993 Kuber
5,331,983 A 7/1994 Father
5,483,982 A 1/1996 Bennett et al.
5,647,385 A 7/1997 Zebuhr (Continued)

FOREIGN PATENT DOCUMENTS

EP 2145559 A1 1/2010
JP S6388314 U 6/1988

(Continued)

OTHER PUBLICATIONS

"Examination Report No. 1", for Australian Application No. 2021349285, dated Oct. 10, 2024, 3 pages.

(Continued)

*Primary Examiner* — Tatiana L Nobrega

(74) *Attorney, Agent, or Firm* — Sheppard Mullin Richter & Hampton LLP

(57) ABSTRACT

An oral hygiene system including a head with a base portion with arms extending to support an embrasure cleaning feature and flossing filament. The system may include removeable heads with different configurations directed to different oral environments and uses.

4 Claims, 9 Drawing Sheets

(56) References Cited

U.S. PATENT DOCUMENTS

| | | | | |
|---|---|---|---|---|
| 5,674,385 | A | 10/1997 | Ivaschenko | |
| 6,526,994 | B1 | 3/2003 | Santoro | |
| 7,059,334 | B2 | 6/2006 | Dougan et al. | |
| 7,146,989 | B2 | 12/2006 | Forssell | |
| 7,174,904 | B2 | 2/2007 | Ochs et al. | |
| 8,025,068 | B2 | 9/2011 | Culver | |
| 8,069,865 | B1 * | 12/2011 | Winter | A61C 15/046 132/329 |
| D668,389 | S | 10/2012 | Zekaj | |
| 8,375,961 | B2 | 2/2013 | Prokopchuk | |
| 8,523,888 | B2 * | 9/2013 | Gatzemeyer | A46B 15/0081 15/187 |
| 8,631,807 | B2 | 1/2014 | Morgan | |
| 8,714,165 | B2 | 5/2014 | Thomas | |
| 8,763,615 | B1 | 7/2014 | Dominguez et al. | |
| 8,893,733 | B2 | 11/2014 | Welt et al. | |
| D833,679 | S | 11/2018 | Zoghbi | |
| 2002/0178519 | A1 | 12/2002 | Zarlengo | |
| 2005/0172982 | A1 | 8/2005 | Ochs et al. | |
| 2006/0052805 | A1 | 3/2006 | Cwik | |
| 2006/0054180 | A1 | 3/2006 | Getgey et al. | |
| 2006/0150999 | A1 | 7/2006 | Kneller | |
| 2006/0169299 | A1 * | 8/2006 | Jansheski | A61C 15/046 132/323 |
| 2006/0174911 | A1 | 8/2006 | Naruse | |
| 2008/0066776 | A1 | 3/2008 | Chodorow et al. | |
| 2008/0163888 | A1 * | 7/2008 | Chen | A61H 13/00 601/139 |
| 2008/0185016 | A1 * | 8/2008 | Jansheski | A61C 15/046 132/324 |
| 2009/0090380 | A1 | 4/2009 | Culver | |
| 2009/0165814 | A1 | 7/2009 | Welt et al. | |
| 2010/0269280 | A1 | 10/2010 | Thomas | |
| 2012/0111358 | A1 * | 5/2012 | Prokopchuk | A61C 15/046 132/323 |
| 2012/0138083 | A1 * | 6/2012 | Tseng | A61C 15/046 132/323 |
| 2012/0167913 | A1 | 7/2012 | Caldwell | |
| 2013/0000668 | A1 | 1/2013 | Madsen | |
| 2013/0048012 | A1 * | 2/2013 | Lin | A61C 15/00 132/323 |
| 2013/0061868 | A1 | 3/2013 | Chuang | |
| 2013/0239986 | A1 | 9/2013 | Pruett | |
| 2014/0335474 | A1 | 11/2014 | Shaw | |
| 2014/0366903 | A1 * | 12/2014 | Chun | A61C 15/046 132/200 |
| 2015/0064653 | A1 | 3/2015 | Grobbee | |
| 2019/0090999 | A1 | 3/2019 | Vetter et al. | |
| 2020/0383693 | A1 * | 12/2020 | Jun | A61C 15/046 |
| 2020/0383694 | A1 | 12/2020 | Jun et al. | |
| 2021/0369424 | A1 | 12/2021 | Grätz | |
| 2022/0008176 | A1 | 1/2022 | Andersen et al. | |
| 2022/0087798 | A1 | 3/2022 | Ritz | |
| 2022/0125563 | A1 | 4/2022 | Snyder | |
| 2024/0081963 | A1 | 3/2024 | Coxe et al. | |
| 2025/0009487 | A1 | 1/2025 | Snyder | |

FOREIGN PATENT DOCUMENTS

| | | | | |
|---|---|---|---|---|
| JP | H0788122 | A | 4/1995 | |
| JP | 2004255184 | A | 9/2004 | |
| JP | 2008520332 | A | 6/2008 | |
| JP | 4599549 | B2 | 10/2010 | |
| KR | 20130068916 | A | 6/2013 | |
| WO | WO-2011023831 | A2 * | 3/2011 | A46B 3/18 |

OTHER PUBLICATIONS

EPO, “Extended European Search Report”, for EP Application No. 21873650.2, dated Aug. 16, 2024, 10 pages.
JPO, “Notice of Allowance for Japanese Application No. 2023-544187, dated Jan. 21, 2025, 6 pages, with English translation”.
JPO, “Office Action for Japanese Application No. 2023-544187, dated Oct. 15, 2024, 4 pages, with English translation”.
USPTO, “Non-Final Office Action for U.S. Appl. No. 18/888,040, mailed Nov. 7, 2024, 23 pages”.
USPTO Final Office Action, U.S. Appl. No. 18/888,040 mailed Feb. 21, 2025, 27 pages.
Non Final Office Action for U.S. Appl. No. 18/888,040, mailed May 29, 2025, 14 pages.
EPO Communication under Rule 71(3) issued in App. No. EP21873650 dated Jan. 29, 2026 (pp. 1-35).
Chinese Office Action (including English translation) issued in App. No. CN202180078218, dated Oct. 24, 2025, 10 pages.
Office Action (Final Rejection) dated Dec. 12, 2025 for U.S. Appl. No. 18/888,040 (pp. 1-15).
The International Search Report and Written Opinion for PCT Application No. PCT/US21/52486, mailed Apr. 26, 2022, 12 pages.
The Invitation to Pay Additional Fees for PCT Application No. PCT/US21/52486, mailed Jan. 31, 2022.
Office Action for U.S. Appl. No. 17/488,290, mailed on Sep. 26, 2023, Daniel Snyder, “Dental Cleaning Device”, 18 pages.
Chinese Office Action (including English translation) issued in App. No. CN202180078218, dated Apr. 10, 2026 (pp. 1-9).

* cited by examiner

DENTAL CLEANING DEVICE

CROSS-REFERENCE TO RELATED APPLICATION

This Application is a continuation of and claims priority to U.S. patent application Ser. No. 17/488,290, filed Sep. 28, 2021, which claims priority to U.S. Provisional Patent Application No. 63/084,479, filed Sep. 28, 2020, the entirety of which are incorporated herein by reference.

BACKGROUND

Maintaining good oral hygiene can be difficult as it requires more than just the semi-annual visit to the dentist for a professional teeth cleaning. Proper daily personal care must be carried out to reduce the risk of dental caries (cavities), gingivitis (gum disease), halitosis (bad breath) and other oral diseases. Poor oral health has also been shown to increase the risk of or contribute to the complications of systemic conditions such as cardiovascular disease, diabetes, pneumonia, and pregnancy (mayo clinic). Research is currently being done to investigate other possible links of gum disease to Alzheimer's Disease and Rheumatoid Arthritis. The current market is replete with various devices that can be helpful in addressing the needs of the mouth. Manual and electric toothbrushes, flossers, gum stimulators, and tongue scrapers, along with all kinds of rinses have their place at the bathroom sink when it comes time to wash your mouth.

The purpose and effectiveness of various toothbrushing devices will not be addressed by this discussion beyond to say that there are areas of the mouth that are left unclean by typical toothbrushing methods. Some of those particular areas left wanting by toothbrushing alone include, but are not limited to, the interdental spaces (flosser), gingival sulcus (embrasure brush), tongue (scraper) and under the wire of braces (finger-like projections).

For those with traditional orthodontic apparatuses, brackets and wires, keeping the tooth anterior surfaces clean under the wires and around the brackets with a toothbrush can be difficult. Gum health is also often reduced as passive stimulation goes down as well. Additionally prosthetic devices such as bridges, dentures and implants create unique cleaning challenges.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2B shows a plane view from one side of illustrative oral care device.

FIG. 2C shows an oblique perspective view of an illustrative device that includes a view of an end of the handle with a power button.

FIG. 3B shows a side view of illustrative headpiece.

FIG. 5B shows a plane view from one side of illustrative oral care device.

FIG. 5C shows an oblique perspective view of an illustrative device that includes a view of an end of the handle with a power button.

FIG. 6B shows a side view of illustrative headpiece.

FIG. 9B shows an example of headpiece interacting in a mouth setting.

FIG. 9C shows an example of headpiece interacting in a mouth setting.

DETAILED DESCRIPTION

Overview

This disclosure is directed to oral hygiene systems. In examples, illustrative devices may include a multifunctional handheld oral hygiene system that includes various headpieces and a reusable, manual (non-vibrating) or electric (vibrating) or otherwise powered, handles. In examples, the various headpieces can be disposable. In examples, the various headpieces may be attached to the various handles to provide the desired combination of cleaning features. A headpiece can include any combination of the following features: suspended dental floss, embrasure brushes, tongue scraper, bracket brush, toothface scrub, prosthetic sweep. Each of these headpieces may be interchangeable with either the manual or powered vibrating handles and may be intended to be disposed of after a certain number of uses and replaced with a new headpiece. The reusable handle may be hand powered, battery powered, rechargeable or plugged in.

While there are examples, of single function devices, for example, U.S. Pat. Nos. 5,483,982, 8,631,807, and US Pat. App. Pub. 2013/0000668 show flossing, U.S. Pat. No. 5,483,982 shows scraping, and U.S. Pat. No. 2,016,597 shows stimulating, there is a long felt need in the industry to improve upon and integrate multiple functionalities into one device or system.

In examples, an illustrative device of the present disclosure may combine a uniquely designed floss holder with step-tapered arms housing tooth surface scrubs and gum stimulating finger-like projections along with the original tongue scraper headpiece. This may be especially helpful in caring for those currently undergoing orthodontic correction (braces).

In examples, a headpiece has two arms and would have longer, flatter embrasure sweeps that could pass under fixed bridges, implants or dentures.

Fully disposable embodiments are also contemplated. In examples, it includes an embrasure brushes, floss and one or more tongue scraper blades. In examples, the handle rides parallel with the fixed head as opposed to perpendicular as in other examples. In examples, the headpiece may be coupled to a ring like attachment for the end of a finger or thumb.

Any one of these examples may be scaled down for pediatric use. For clarity of the present disclosure, discussion of the specifics of pediatric use are limited.

Illustrative Device

Figure 1:
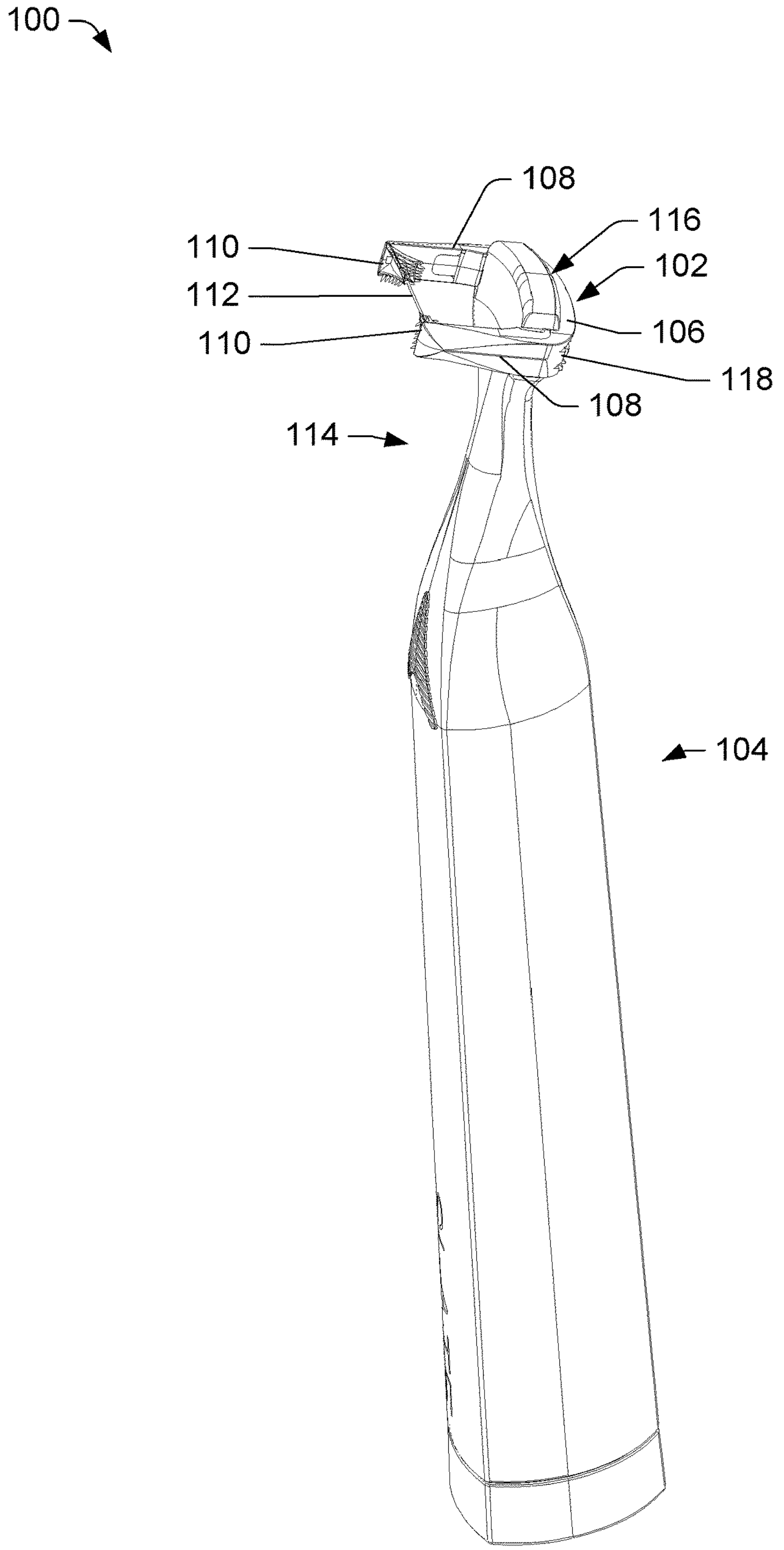
FIG. 1 shows and illustrative oral care device.

FIG. 1 shows and illustrative oral care device 100. In examples, the oral car device 100 comprises a headpiece 102 and a handle portion 104. For example, the headpiece 102 may include a base portion 106 with arms 108 extending from the base portion 106. In examples, the arms 108 include a cleaning feature 110, for example, a sweep. In some examples, the sweep may comprise a tapered shape, for example, to engage with areas of the gums between and/or adjacent to teeth. In other examples, the cleaning feature 110 includes a plurality of cleaning structures. In examples, the cleaning structures may have ribs, protrusions, finger-like structures that may interact with the gums and/or teeth. In examples, the cleaning feature 110 may have a substantially pyramidic shape or taper. Additionally or alternatively, the pyramidic shape and/or taper may be isometric or asymmetrical. Additionally or alternatively, the headpiece 102 includes a filament 112. In examples, the filament 112 comprises a floss string or a floss ribbon.

Additionally, or alternatively, cleaning feature 110 may include a sweep. In examples, the sweep may include a cone or pyramid with a base that rests on the inner face of the floss head arms, and tapers to a point where the floss emerges. The base shapes can be circle, oval, square, rectangle, triangle, pentagon, hexagon, star with 3,4,5,6,7, or 8 points and the sides of any of these shapes can have concave and/or convex sides.

Additionally or alternatively, the handle portion 104 includes a neckpiece 114. In examples, the neckpiece 114 engages the headpiece 102 at an interlock 116. In examples, the engagement between the headpiece 102 and the handle portion 104 create an angle between the handle end of the handle portion 104 and the headpiece 102. In examples, the angle is obtuse when referenced from arms 108 and the handle of the handle portion 104. In examples, the angle provides improved access and use of the illustrative oral care device 100 in a user's mouth. In examples, the interlock 116 comprises a lock and key style engagement system where a portion of the headpiece 102 positively engages a portion of the handle portion 104 in a desired configuration. In examples, the desired configuration may include a secure attachment between the headpiece 102 and the handle portion 104. Additionally or alternatively, the desired configuration may ensure that the desired angle between the headpiece 102 and handle portion 104 is achieved and/or preserved during use.

In examples, the angle may be considered a contra-angle bend of between 1 and 30 degrees. In examples, this allows the neck of the device to easily be oriented parallel to the biting surfaces of the teeth and the floss head arms perpendicular to the biting surfaces.

In some examples, the headpiece 102 includes a tongue focused cleaning device. For example, headpiece 102 may include a tongue scraper 118. In examples the tongue scraper 118 comprises a ridge or plurality of ridges disposed on an edge or side of the base portion 106 distal to the portion of the base portion 106 that engages with the handle portion 104.

Figure 2C:
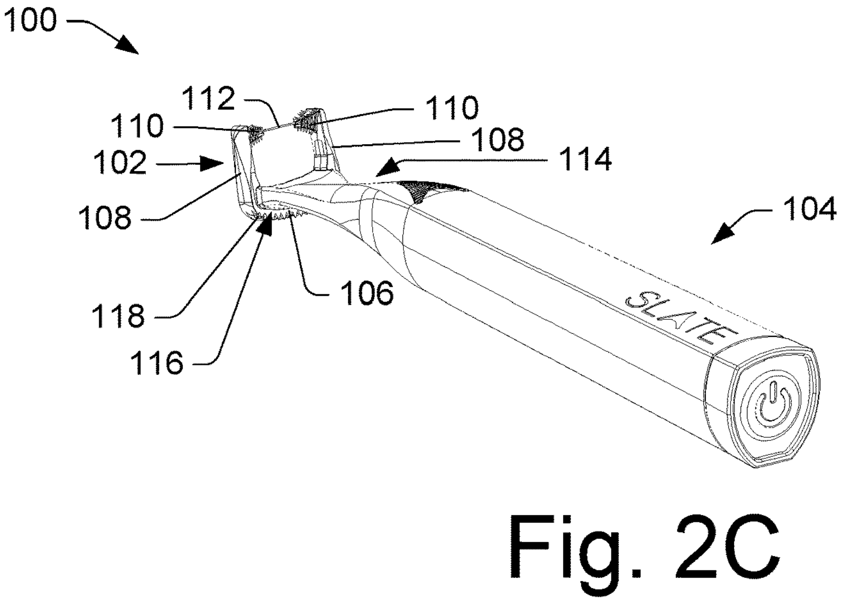
FIGS. 2A-2C show additional views of the illustrative oral care device.
Figure 2A:
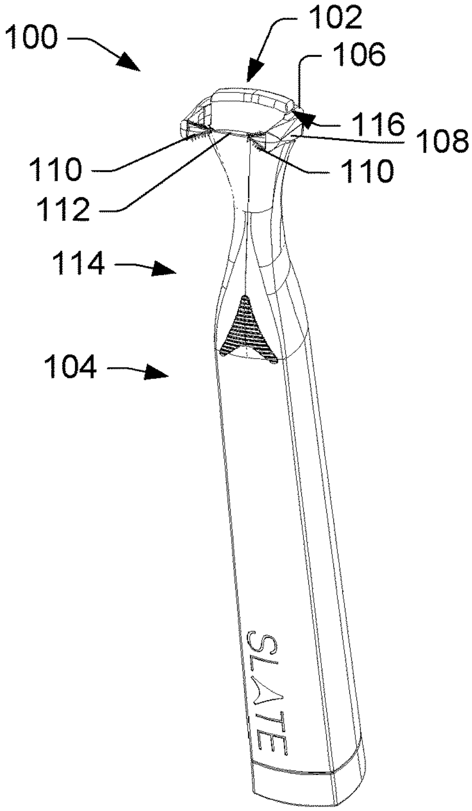
Figure 2B:
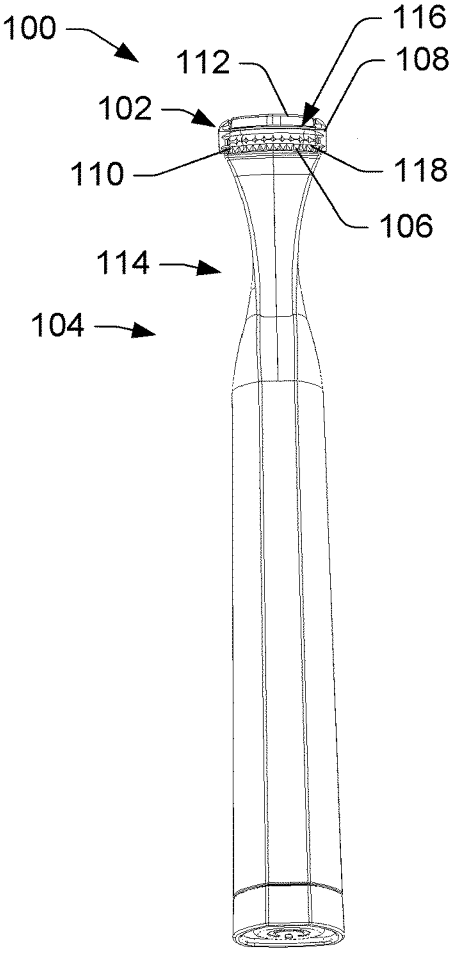

FIGS. 2A-2C show additional views of the illustrative oral care device 100. For example, FIG. 2A shows an oblique perspective view of illustrative oral care device 100. FIG. 2B shows a plane view from one side of illustrative oral care device 100. In this view, an example, of tongue scraper 118 is visible. FIG. 2C shows an oblique perspective view of an illustrative device that includes a view of an end of the handle with a power button. In examples, where a power button is included, a vibratory feature may be included. In examples, with a vibratory feature, power may be provided by replaceable or rechargeable power devices, for example, a battery or capacitor.

Figure 3A:
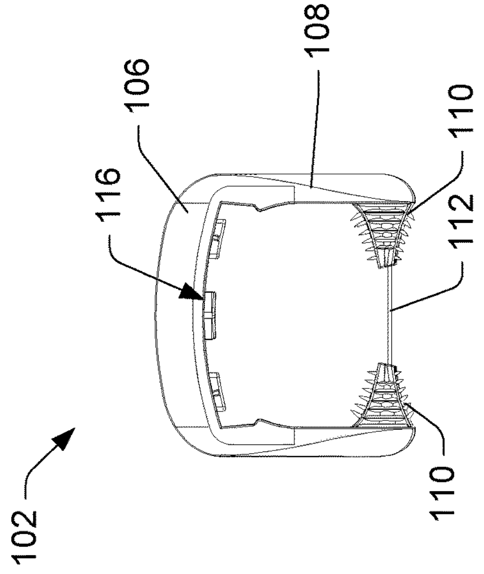
FIGS. 3A-3E show different views of an illustrative headpiece.
Figure 3B:
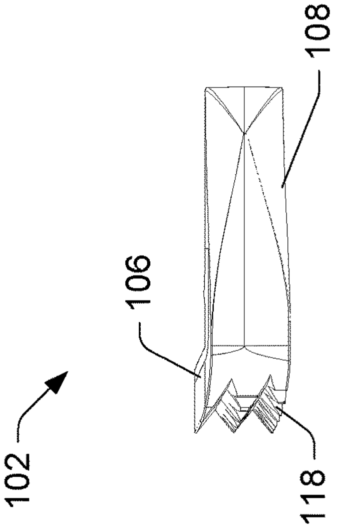
Figure 3C:
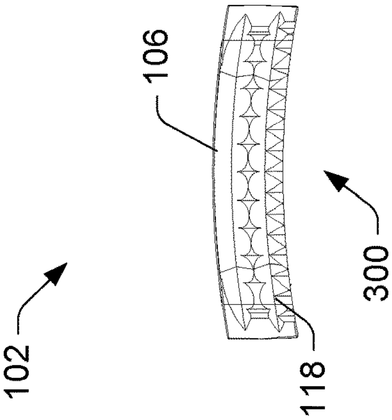
Figure 3D:
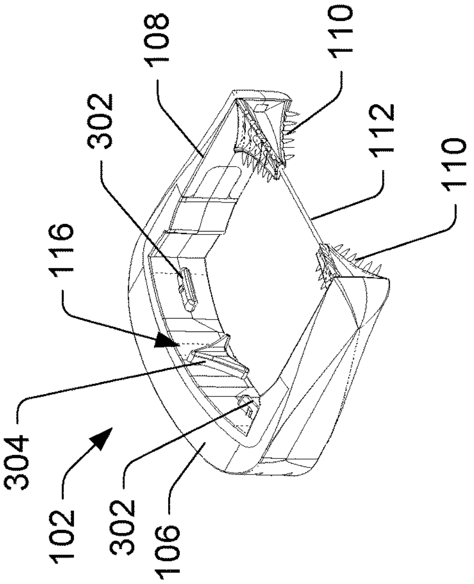
Figure 3E:
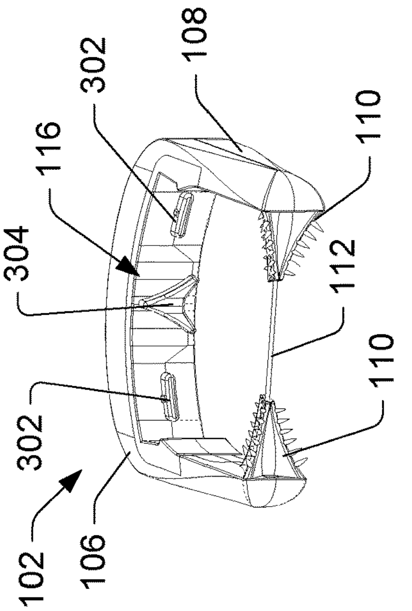

FIGS. 3A-3E show different views of an illustrative headpiece 102. For example FIG. 3A shows a top view of headpiece 102. FIG. 3B shows a side view of illustrative headpiece 102. FIG. 3C shows a side view of illustrative headpiece 102 that is perpendicular to the view shown in FIG. 3B. In this view, an example of a portion of an illustrative interlock 116 is shown in arch 300. FIGS. 3D and 3E show additional views of headpiece 102 showing additional portions of an illustrative interlock 116. For example, FIGS. 3D and 3E show a first interlocking feature 302 and a second interlocking feature 304. In examples, the first interlocking feature 302 and the second interlocking feature 304 positively engage with a recessed equivalent portion disposed on the handle portion 104. In examples, a combination of the first interlocking feature 302 and the second interlocking feature 304 and or arch 300 may be used to permit only a desired orientation of the headpiece 102 relative to the handle portion 104.

Figure 4:
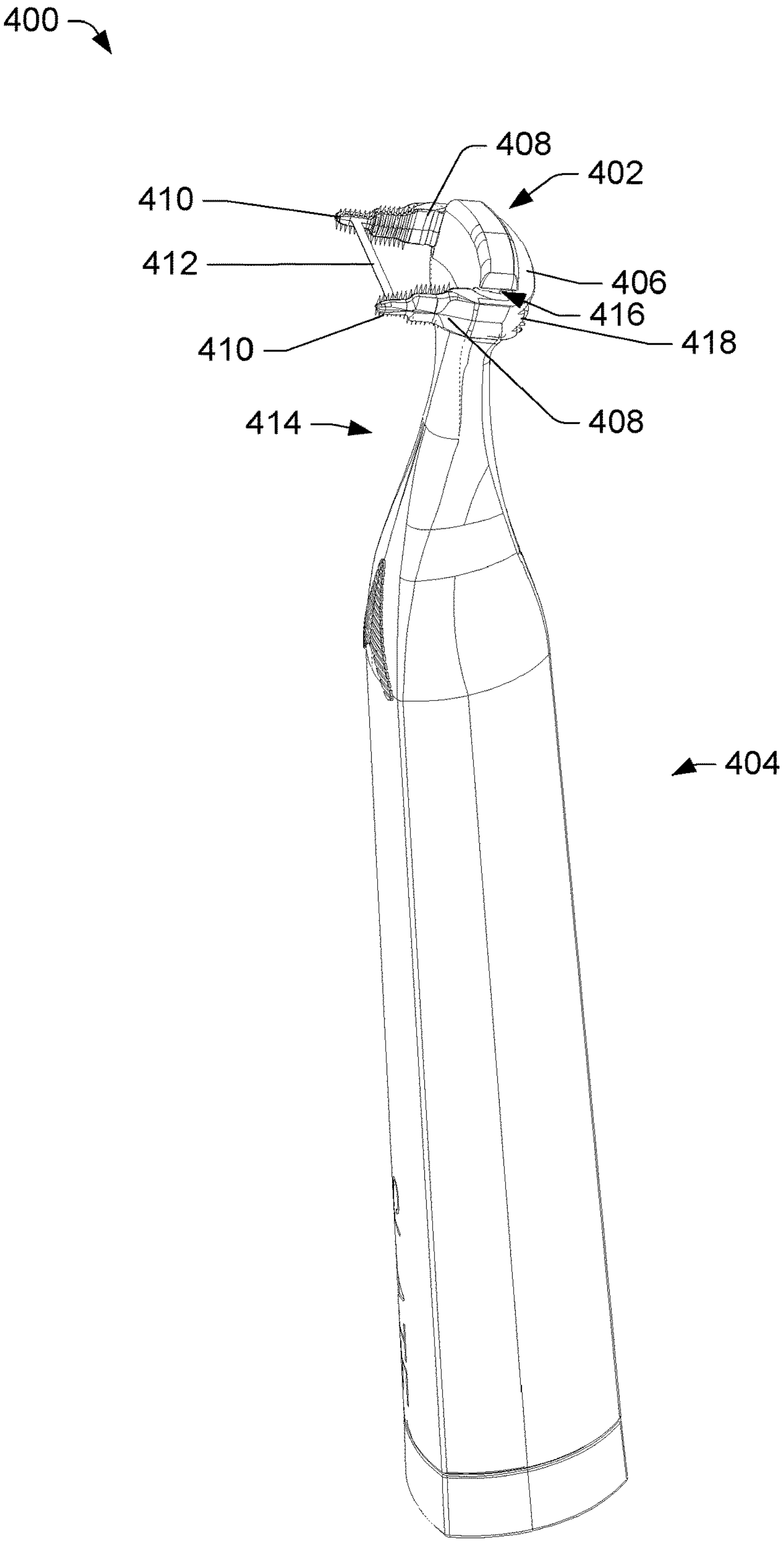
FIG. 4 shows and illustrative oral care device.

FIG. 4 shows and illustrative oral care device 400. In examples, the oral care device 400 comprises a headpiece 402 and a handle portion 404. For example, the headpiece 402 may include a base portion 406 with arms 408 extending from the first and second ends of the base portion 406. Each of the arms has opposing inner and outer surfaces, opposing top and bottom surfaces disposed between the inner and outer surfaces, a first portion having a first width extending between the top and bottom surfaces, a first tapering portion, a second portion having a second width extending between the top and bottom surfaces, a second tapering portion and a third portion having a third width extending between the top and bottom surfaces. The first portion is adjacent to the base portion 406 and defines a proximal end of the arm. The first tapering portion is disposed between the first portion and the second portion, and the second tapering portion is disposed between the second portion and the third portion. The third portion defines a distal end of the arm. The arms taper in a step-wise manner such that the second width is less than the first width and greater than the third width. In examples, the arms 408 include a cleaning feature 410, for example, a sweep. In some examples, the sweep may comprise a tapered shape, for example, to engage with areas of the gums between and/or adjacent to teeth. In other examples, the cleaning feature 410 includes a plurality of cleaning structures. In examples, the cleaning structures may have ribs, protrusions, finger-like structures that may interact with the gums and/or teeth. Additionally or alternatively, the headpiece 402 includes a filament 412 extending between the inner surfaces of the arms 408. In examples, the filament 412 comprises a floss string or a floss ribbon.

Additionally or alternatively, cleaning feature 410 may include bristles. In examples, the bristles may emerge from the arms 408 at an angle of between 0 and 45 degrees and may be anywhere from 1-5 mm in length.

Additionally or alternatively, the handle portion 404 includes a neckpiece 414. In examples, the neckpiece 414 engages the headpiece 402 at an interlock 416. In examples, the engagement between the headpiece 402 and the handle portion 404 create an angle between the handle end of the handle portion 404 and the headpiece 402. In examples, the angle is obtuse when referenced from arms 408 and the handle of the handle portion 404. In examples, the angle provides improved access and use of the illustrative oral care device 400 in a user's mouth. In examples, the interlock 416 comprises a lock and key style engagement system where a portion of the headpiece 402 positively engages a portion of the handle portion 404 in a desired configuration. In examples, the desired configuration may include a secure attachment between the headpiece 402 and the handle portion 404. Additionally or alternatively, the desired configuration may ensure that the desired angle between the headpiece 402 and handle portion 404 is achieved and/or preserved during use.

In some examples, the headpiece 402 includes a tongue focused cleaning device. For example, headpiece 402 may include a tongue scraper 418. In examples the tongue scraper 418 comprises a ridge or plurality of ridges disposed on an edge or side of the base portion 406 distal to the portion of the base portion 406 that engages with the handle portion 404.

Figure 5A:
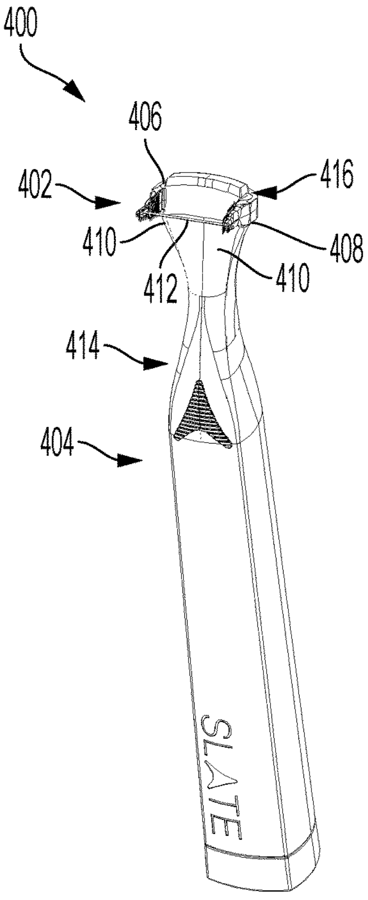
FIGS. 5A-5C show additional views of the illustrative oral care device.
Figure 5B:
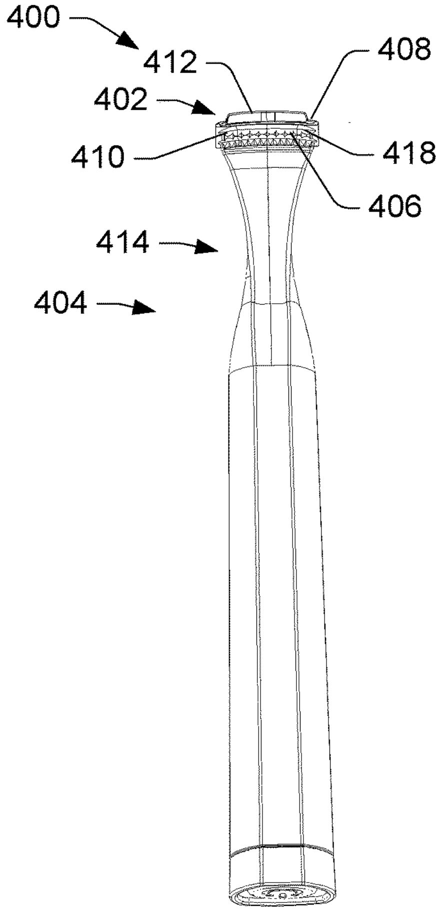
Figure 5C:
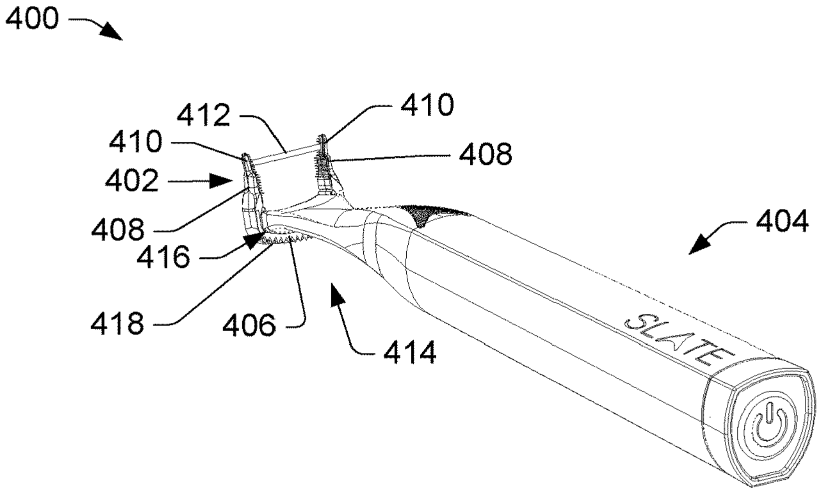

FIGS. 5A-5C show additional views of the illustrative oral care device 400. For example, FIG. 5A shows an oblique perspective view of illustrative oral care device 400. FIG. 5B shows a plane view from one side of illustrative oral care device 400. In this view, an example, of tongue scraper 418 is visible on the posterior surface of the base portion 406 of the headpiece 402. FIG. 5C shows an oblique perspective view of an illustrative device that includes a view of an end of the handle with a power button. In examples, where a power button is included, a vibratory feature may be included. In examples, with a vibratory feature, power may be provided by replaceable or rechargeable power devices, for example, a battery or capacitor.

Figure 6A:
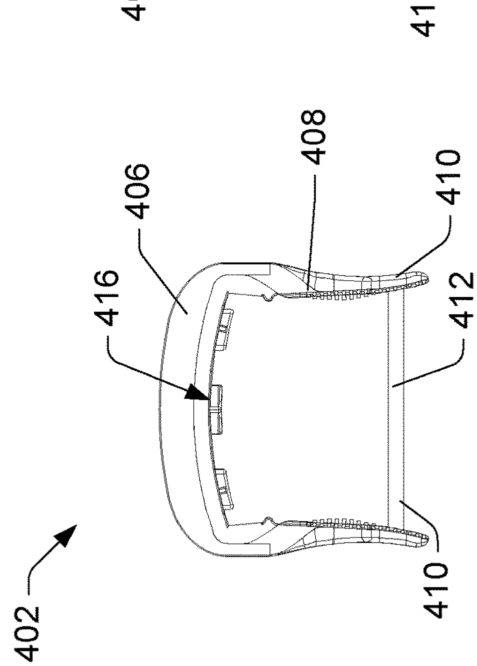
FIGS. 6A-6E show different views of an illustrative headpiece.
Figure 6B:
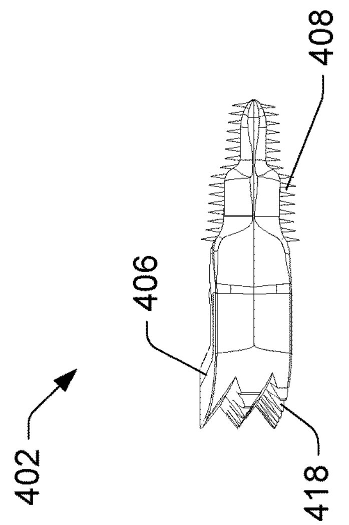
Figure 6C:
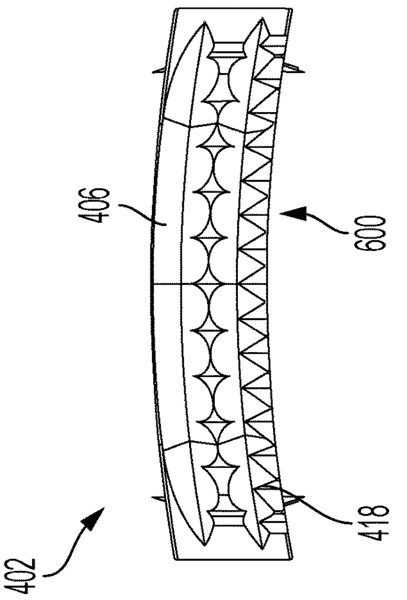
Figure 6D:
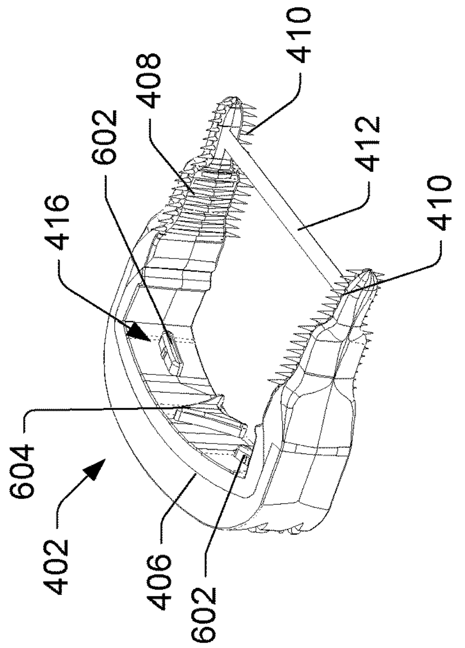
Figure 6E:
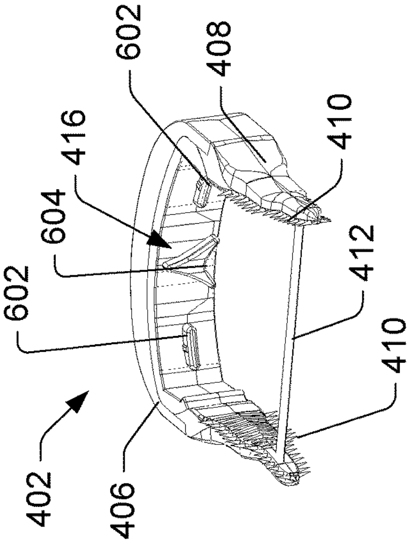

FIGS. 6A-6E show different views of an illustrative headpiece 402. For example FIG. 6A shows a top view of headpiece 402. FIG. 6B shows a side view of illustrative headpiece 402. FIG. 6C shows a side view of illustrative headpiece 402 that is perpendicular to the view shown in FIG. 3B. In this view, an example of a portion of an illustrative interlock 416 is shown in arch 600. FIGS. 6D and 6E show additional views of headpiece 402 showing additional portions of an illustrative interlock 416 disposed on the anterior surface of the base portion 406. For example, FIGS. 6D and 6E show a first interlocking feature 602 and a second interlocking feature 604. In examples, the first interlocking feature 602 and the second interlocking feature 604 positively engage with a recessed equivalent portion disposed on the handle portion 404. In examples, a combination of the first interlocking feature 602 and the second interlocking feature 604 and or arch 600 may be used to permit only a desired orientation of the headpiece 402 relative to the handle portion 404.

Figure 7C:
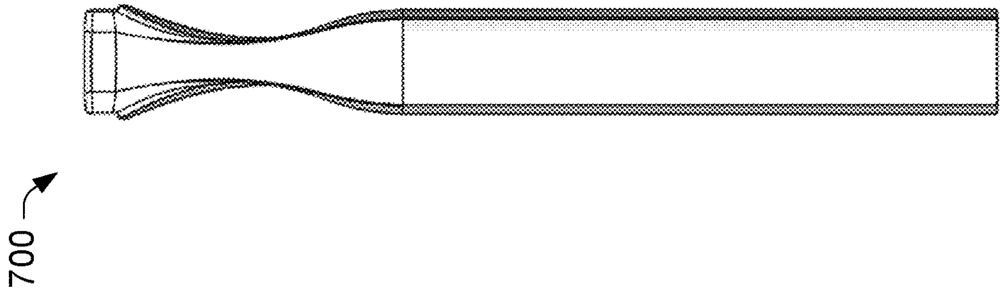
FIGS. 7A-7C show an illustrative example of a handle portion.
Figure 7B:
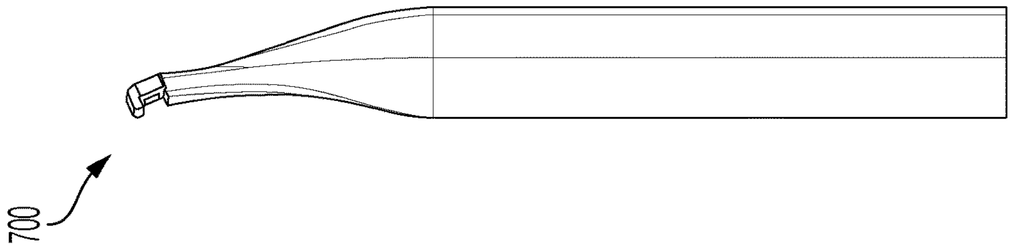
Figure 7A:
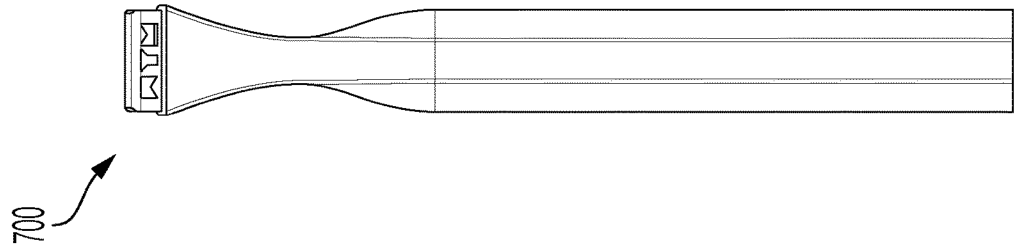

FIGS. 7A-7C show an illustrative example of a handle portion 700. In examples, the handle portion 700 has positive engagement features and an angled neck enabling a desired angle between the handle portion 700 and a headpiece when attached.

Figure 8C:
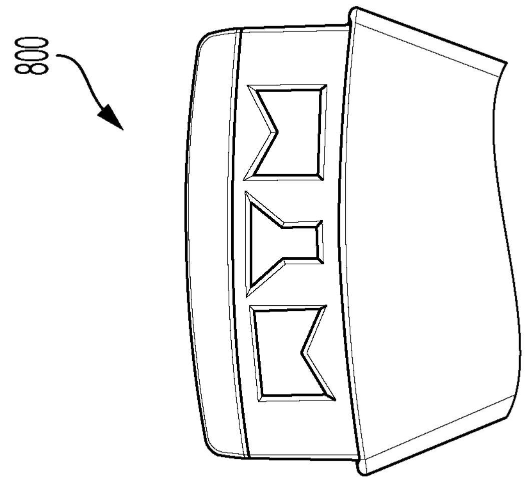
FIGS. 8A-8C show views of an illustrative handle portion.
Figure 8B:
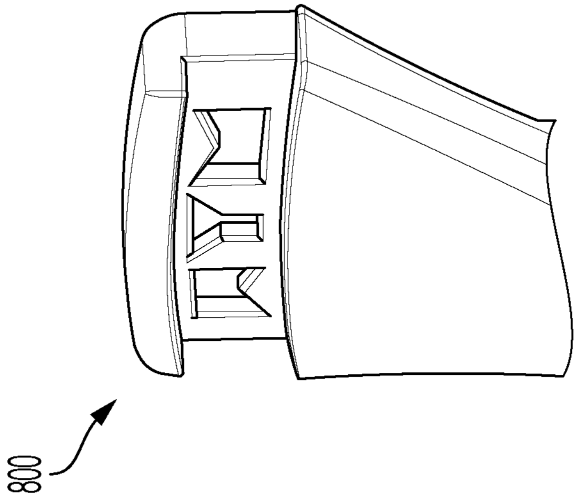
Figure 8A:
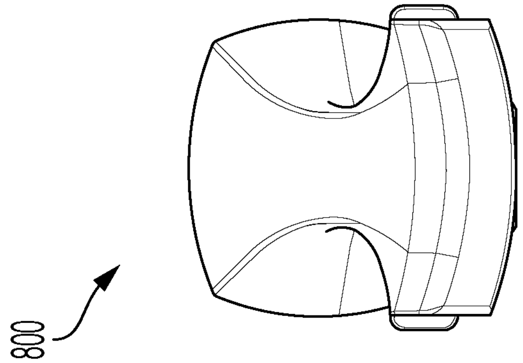

FIGS. 8A-8C show views of an illustrative handle portion 800. In examples, the handle portion 800 include positive engagement features and orientation features that interact with and orient a headpiece when attached.

Figure 9A:
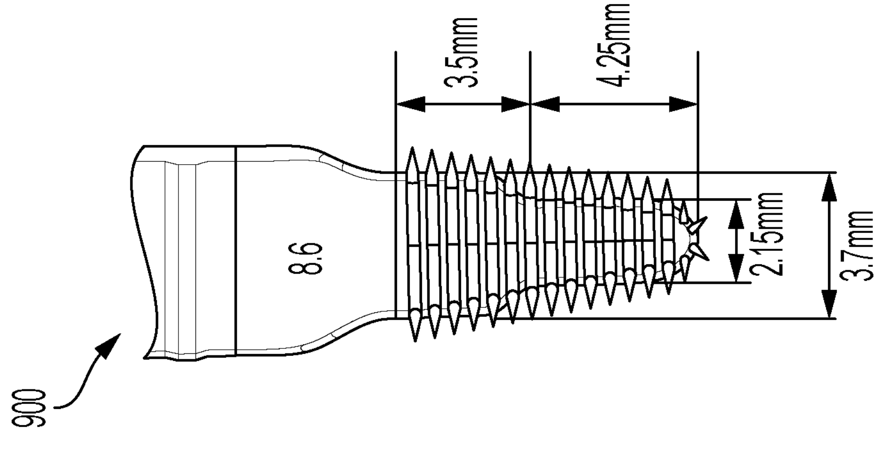
FIGS. 9A-9C show illustrative views of a portion of a headpiece.
Figure 9B:
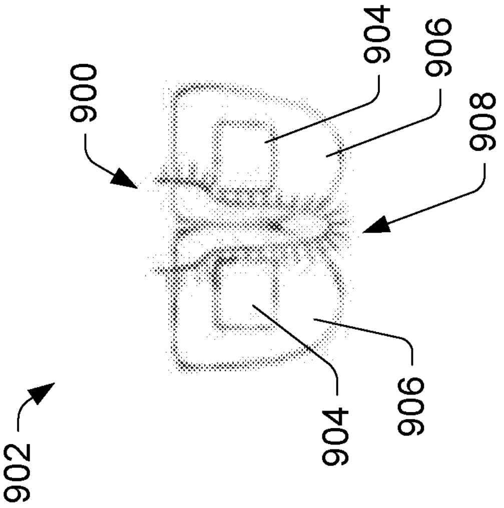
Figure 9C:
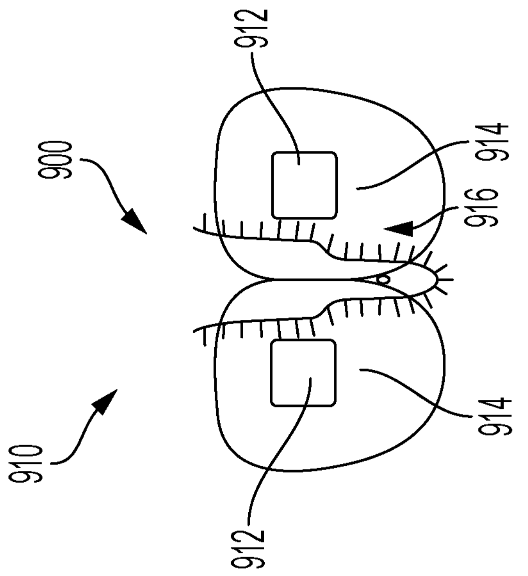

FIGS. 9A-9C show illustrative views of a portion of a headpiece 900. For example, FIG. 9A shows an illustrative headpiece 900 with illustrative dimensions where the second width of the second portion is 3.7 mm, the third width of the third portion is 2.15 mm, a total length of the second portion and second tapering portion is 3.5 mm and a length of the third portion is 4.25 mm. It is understood that the dimensions shown are illustrative and represent a measurement within a range. In examples, the range of each dimension may include, but is not limited to +/−1%, +/−2%, +/−5%, +/−10%, +/−50%, +/−100%, +/−200%, or more.

FIG. 9B shows an example of headpiece 900 interacting in a mouth setting 902 where a first tapered portion of headpiece 900 engages between portions of an orthodontic system 904, for example a bracket of a brace system, connected to a tooth 906 creating a region 908 therebetween. In this example, the first tapered portion of headpiece 900 fits into the region 908 allowing for cleaning of the orthodontic system 904 and the tooth 906.

FIG. 9C shows an example of headpiece 900 interacting in a mouth setting 910 where a second tapered portion of headpiece 900 engages between portions of an orthodontic system 912 connected to a tooth 914 creating a region 916 therebetween. In this example, the second tapered portion of headpiece 900 fits into the region 916 allowing for cleaning of the orthodontic system 912 and the tooth 914.

FIGS. 9C and 9B show examples, where the second tapered portion of headpiece 900 doesn't fit into the region 908, but does fit into region 916. In some examples, the width, thickness, and length of the tapered portions are configured to fit into and effectively clean the region 908 and the region 916.

In various examples, for example as discussed with respect to FIGS. 1-9C, a device may be a multifunctional handheld oral hygiene system comprising various headpieces and a reusable, manual (non-vibrating) or electric (vibrating) or otherwise powered, handle. In examples, the various headpieces can be disposable. In examples, the various headpieces may be attached to the various handles to provide the desired combination of cleaning features. A headpiece can include any combination of the following features: suspended dental floss, embrasure brushes, tongue scraper, bracket brush, toothface scrub, prosthetic sweep. Each of these headpieces will be interchangeable with either the manual or powered vibrating handles and may be intended to be disposed of after a certain number of uses and replaced with a new headpiece. The reusable handle may be hand powered, battery powered, rechargeable or plugged in.

Illustrative Device Heads and Connections

In various examples, for example as discussed with respect to FIGS. 1-9C, a device may include a handle having a neckpiece that interfaces with each of the various disposable combination headpieces. In examples, the neckpiece may be uniquely designed and shaped. In examples, the headpiece has a base portion and a pair of spaced-apart jaws extending perpendicular from the base to engage the neckpiece of the handle. In examples, the engagement comprises the base to embrace the neckpiece in a snap-fit fashion once the headpiece is in correct alignment with respect to the handle. In this example, the snap-fit may provide an audible indication that the base and the neckpiece are properly engaged. In examples, the snap-fit may provide a detectable movement from an unsecured position to a secured position indicating that the base and the neckpiece are properly engaged.

In examples, the device may use a lock and key style engagement system to ensure the headpiece is oriented correctly with the neck of the handle. In examples, this configuration my comprise an asymmetric recessed feature found on the neck of the handle with a corresponding protrusion on the inside face of the base of the headpiece, or vice versa. These interacting features may be of various shapes and sizes. Additionally or alternatively, the interacting features may take the form of text or logos. In examples, the interacting features may take the form of raised two dimensional images or reliefs, for example showing a raised (or depressed) silhouette of an object (e.g., an animal, vehicle, sports object, face, among others, or combinations thereof). In examples, one or both of the interacting features or supporting material may be transparent or substantially transparent. In examples, when the two interacting features are joined, one or both may be visible or partially visible to a user. The visible interacting features may provide an indication that the neckpiece and base are properly engaged.

In examples, the headpiece may be held in place by snap-fitting. In examples, the jaws of the headpiece have snap-fit projections and the other of the jaws of the headpiece defining corresponding recesses which together with the snap-fit projections securely engage the headpiece.

In examples, the handle portion may be made of wood, plastic, metal, rubber, organic, biodegradable materials, among others or combinations thereof. It may have various finished, textures, colors and ergonomic shapes. In examples, the handle portion may be configured in length and shape to better suit pediatric use. In examples, the length of the handle can range from 150 mm-200 mm (184 mm) and the width from 10 mm-40 mm (20 mm). In examples, the handle portion may be hollowed out to allow placement of a motor and power source or solid thickness. In examples, the handle portion may have an approximately 160 degree contra-angle bend or a range of 90-180 or it could be straight from top to bottom. Without this ergonomic shape, a user would have to open unusually wide to have the gum massagers in the correct orientation during use. In examples, the handle portion may be rigid or flexible where the handle narrows to meet the neck. In examples, the handle portion may be a single piece so when the replaceable head is secured in place, all movements of the user are directly translated to the floss/embrasure brush/tongue scraper. In examples, the handle portion may be made of multiple pieces. An on/off button or switch may be provided in the powered handle and a motor and power source.

Illustrative Flosser/Stimulator

In various examples, for example as discussed with respect to FIGS. 1-9C, a headpiece provides features to clean interproximal surfaces of teeth while stimulating gum tissue. In examples, the device comprises anatomically shaped embrasure brushes. In examples, the embrasure brushes serve multiple purposes. For example, soft textured structures are shaped to make contact with both tooth surfaces as well as the bridging gumline between them. This interaction may be available to one or both the outer and inner gingival sulci as both arms/jaws may have these structures. The materials to be used for these structures may include plastics, rubber, silicone, bristles or brushes. Various examples contemplate various shapes. For example, the structure may comprise a concave equilateral hexagon from one view. Along each of the three points or spines of the hexagon/pyramid there may be a row of finger-like projections to increase contact with the oral surfaces. This may have an overall tapered shape forming a cone or pyramid like profile where the base is attached to the flossing arm and the floss passes through the pyramid and exits from an apex, bridging the two arms.

In examples, a floss holder headpiece may have various arms and lengths. For example, the length of the arms of the head may range from 15 mm-30 mm (16.5 mm). The space between the arms may range from 15 mm-30 mm (20 mm). In examples, the floss holder headpiece may be decreased in size to better suit pediatric users. In examples, the arms may leave the base of the head at a perpendicular, acute or obtuse angle. In examples, the floss holder headpiece may be made of wood, plastic, metal, rubber, organic, biodegradable materials, among others or combinations thereof. It may have various finishes, textures, colors, and ergonomic shapes.

In examples, the floss holder headpiece may engage the handle using various techniques and configurations. For example, first and second attachment mechanisms provided on the headpiece and handle, respectively, may use the snap-fit, magnetic, fixed/solid with head, tongue and groove, slide, screw on, straps, fastened, adhesive, among others, or combinations thereof. In examples, the floss material include nylon, plastic, teflon/glide, organic fibers, animal hair, among others, or combinations thereof.

Illustrative Anatomically-Shaped Embrasure Brushes

In various examples, for example as discussed with respect to FIGS. 1-9C, a device may include embrasure brushes. In examples, a basic shape of the embrasure brush may be a pyramid where the base of the pyramid is a concave equilateral hexagon which lies flat against an extension arm and the other 6 faces of the pyramid taper and converge at the apex of the pyramid from which the floss emerges. In examples, the structure may consist of various materials. For example the core of the sweep may be a simple plastic cone shape with rubber overlay forming the more detailed pyramid structure. Small bristles (rubber or silicon/plastics/nylon/biodegradable materials) may line the ridges of the three acute line angles of the pyramid. In examples, when in use, the orientation of the 3 acute line angles, with their rows of bristles, relative to the users anatomy are as follows: the top row of bristles rides along the underside of the interproximal contact between two teeth and the other two rows of bristles ride along the junction between the teeth and the gum tissue. The two faces of the gum massager that come in contact with the teeth, and are not oriented over the gums, may be texturized with a series of ribs that may engage the tooth surface to scrape, collect, and remove plaque and debris from the tooth surface. Other shapes may work include a cone, triangle, cylinder, star-shape, gradual taper, stepped taper. Spine configuration may also differ, equally spaced, random placement, patterned. Differing sizes, lengths, widths. The embrasure brushes may be scaled down in size and/or shape to better suit pediatric use. Differing rigidity or materials may be used to create the same effect.

Illustrative Scraper

As discussed in US Pat Pub. 2006/0052805, which is incorporated by reference in its entirety, cleaning the tongue is important. Examples of the present disclosure improve upon the techniques and devices currently available. In various examples, for example as discussed with respect to FIGS. 1-9C, a device may include a scraper. In examples, where the concave face of the base of the head engages with the neck of the handle, the exposed convex (or flat) face of the base may act as a tongue scraping surface with single or multiple blades of decreasingly or equally scalloped edges ending with a squeegee-like gathering blade. These blades may bend or arch (or not) toward the top of the handle when properly oriented, acting as a gathering scoop as it is moved in the posterior to anterior direction along the tongue surface, repeated over and over.

In examples, the tongue scraper on the back of the replaceable floss head may have an anatomic and functional shape. Other examples may be less anatomical and functional. An example of a tongue scraper may be convex in both the x-y axis and also the y-z axis. This allows the center (and all other parts) of the tongue to be cleaned, and also allows the debris that is scraped to be corralled and contained by the curved ends. In examples, the first of the 3 silicon/rubber/plastic blades of the tongue scraper with its multiple tinges acts like a comb or rake as it lifts and disrupts debris, the second blade with its scalloped edge will continue to lift and gather debris. The third straight-edged blade squeegees and removes all the bacteria and debris. Other examples use single blades or multiple blades in other combinations. In examples, various heights, lengths or materials of the blades may have similar effects. Vibration may add to its effectiveness and repeating this action over the entire area of the top surface of the tongue would be encouraged.

Illustrative Orthodontia Devices

There are unique cleaning challenges faced by those who require orthodontic care for a time. While some specialized orthodontic floss holders are available, however, they fail to provide the crucial gum stimulation that is often reduced by the placement of the wire and brackets used during the teeth straightening months or years. The brackets and wires also add additional challenges when attempting to clean the front surface of the tooth by traditional toothbrushing methods. In various examples, for example as discussed with respect to FIGS. 1-9C, a device may be tailored to address these issues. In examples, an orthodontic style disposable head may incorporate a thinner set of floss holding arms where the embrasure brushes may be replaced with the addition of tooth scrubbing faces on the internal side of the arms. These arms may feature a step-like taper to accommodate different bracket spacing found on upper and lower teeth. The side edges to these arms may be lined with additional finger-like projections intended to stimulate the gums and remove debris from the sides of the brackets.

An alternative floss holder design, for example orthodontic flosser may have differently shaped arms to allow children and adults with braces to easily floss with brackets and wires in place. The extension arms on the flosser are skinny enough in the front-to-back and side-to-side aspects to allow the extension arm to pass between the ortho brackets of adjacent teeth and under the ortho wire. In one example the inner face of our extension arms may have silicon/rubber ribs that will extend out and clean the front face of the teeth under the wire that often gets missed with normal brushing and flossing. Also the outer edges of the tip of the extension arm will have silicon/rubber bristles(3.6) that will stimulate the gum tissue adjacent to the teeth that often gets inflamed due to lack of stimulation when people are in braces, brush the junction between bracket and tooth where white decalcification rings often develop on teeth around brackets, and clean and sweep away food and debris that collects on the sides of the brackets.

One aspect of cleaning the space between brackets and underneath the wire that has not been fully addressed by other orthodontic flossers is the fact that the space between the brackets varies widely mostly due to the size and width of the teeth themselves. The lower front teeth, for example, are the skinniest teeth, but they are also quite short. So if the extension arms are skinny enough to fit between and clean the sides of the lower front teeth they can also easily pass between the brackets of the upper front teeth, but that space is so wide that the bristles along the edges of the extension arms can't reach and properly clean the sides of the ortho brackets. In examples, the orthodontic flosser includes a stepped design, where the first few millimeters of the tip of the extension arm are skinny enough to pass between small spaces like the lower front teeth, but then the extension arm becomes wider to move the bristles wider to clean the bigger spaces between larger teeth, like the upper front teeth. These upper front teeth are also taller which allows the extension arm to move further into the space which again allows the wider portion of the extension arm to move into the space and brush away debris. The arms could also be a gradual taper as opposed to stepped or uniform width from base to tip.

Illustrative Embrasure Sweeps

In various examples, for example as discussed with respect to FIGS. 1-9C, another configuration contemplated by the present disclosure includes a embrasure sweep. For example, the embrasure sweep may comprise a flossless head with a relatively longer, thinner sweep configured to reach just beyond the halfway point under a bridge or denture/implant to clear away debris, clean surfaces and stimulate gum tissue.

Illustrative Features of Illustrative Figures

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

EXAMPLE CLAUSES

A. A dental cleaning device comprising: a head comprising: a base portion having a first end and second end; a first arm extending from the first end of the base portion; a second arm extending from the second end of the base portion substantially parallel to the first arm; a first sweep disposed at a first end of the first arm distal from the base portion; a second sweep disposed at a first end of the second arm distal from the base portion; and a filament extending between first sweep and the second sweep or between the first end of the first arm and the first end of the second arm.

B. The dental cleaning device of paragraph A, the base portion comprising a mounting feature configured to orientate the head relative to a handle of a body portion.

C. The dental cleaning device of any of paragraphs A-B, the base portion further comprising an indexing feature permitting only a preferred orientation of the head relative to a handle of a body portion when coupled to the body portion.

D. The dental cleaning device of any of paragraphs A-C, further comprising a body portion removably coupleable to the base portion, the body portion comprising: a mounting receiver configured to releasably couple and orientate the body relative to the head portion; and a handle portion coupled to the mounting portion via an angled portion, the angled portion forming an obtuse angle relative to the first arm or second arm.

E. The dental cleaning device of any of paragraphs A-D, the head further comprising a tongue sweep disposed on a side of base portion opposite the first arm and second arm.

F. The dental cleaning device of any of paragraphs A-E, the tongue sweep comprising a plurality of ridges.

G. The dental cleaning device of any of paragraphs A-F, an arm of the first arm or the second arm comprising a step taper from a first width at an end proximate to the base portion to a second width at the first end, the first width larger than the second width.

H. The dental cleaning device of any of paragraphs A-G, the step taper comprising a section disposed between the first end and the end proximate to the base portion having a third width, the third width larger than the second width and smaller than the first width.

I. An oral care device comprising: a handle having a neckpiece; and a headpiece removably coupled to the neckpiece, the headpiece comprising: a tongue scraping feature; a gum stimulating dental floss feature; a base portion; a pair of jaws, spaced apart, coupled to and extending from the base portion to accommodate a length of dental floss between ends distal from the base portion, the jaws extending to embrace the neckpiece therebetween in a preferred orientation of the headpiece with respect to the handle; and an interlock configured to prevent engagement of the neckpiece with the headpiece except when the handle and headpiece are in the preferred orientation.

J. The device of any of paragraphs A-I, wherein the interlock comprises a neck interlock member disposed on the neckpiece and a head interlock member disposed on the headpiece, the neck interlock member and head interlock member configured to engage only when the handle and headpiece are in the preferred orientation.

K. The device of any of paragraphs A-J, wherein the head interlock member comprises a projection on the headpiece and the neck interlock member comprises a recess on the neckpiece to receive the projection.

L. The device of any of paragraphs A-K, wherein the neck interlock member and head interlock member are a push fit when the handle and headpiece are in the preferred orientation.

M. The device of any of paragraphs A-L, wherein the neck interlock member and head interlock member comprise an arc shaped lock and key relationship.

N. The device of any of paragraphs A-M, wherein the interlock arc is slidably engageable in an interlock channel when the headpiece is correctly aligned with the neckpiece.

O. The device of any of paragraphs A-N, wherein the interlock arc is of convex arcuate shape.

P. The device of any of paragraphs A-O, wherein the interlock comprises a single neck interlock member and a single head interlock member.

Q. The device of any of paragraphs A-P, wherein the interlock comprises a plurality of head interlock members on the headpiece and a plurality of neck interlock members on the neckpiece.

R. The device of any of paragraphs A-Q, further comprising: a transversely extending arcuate engagement channel on the neckpiece; and a complementary engagement tongue portion on the headpiece configured to engage a transversely extending engagement groove upon assembly of the neckpiece and the headpiece.

S. The device of any of paragraphs A-R, wherein the headpiece further comprises a releasable lock configured to engage upon assembly with the neckpiece.

T. The device of any of paragraphs A-S, wherein the releasable lock comprises a snap fit projection.

U. The device of any of paragraphs A-T, wherein the snap fit projection is disposed on a jaw of the headpiece or the neckpiece.

V. The device of any of paragraphs A-U, wherein the dental floss is a length of dental floss string.

W. The device of any of paragraphs A-V, wherein the dental floss is a length of dental floss tape.

X. The device of any of paragraphs A-W, wherein the handle further comprises a vibrating motor.

Y. A dental floss holder for assembly to a headpiece of a handle, the dental floss holder comprising: a base portion; and a pair of jaws, spaced apart from the other, and extending from the base portion to accommodate a length of dental floss therebetween, the jaws of the holder extending to embrace a headpiece of a handle therebetween in a correct alignment configuration of the holder with respect to a handle in use, the dental floss holder having a holder interlock to substantially prevent engagement of the holder with a headpiece except when the holder is in a correct alignment configuration.

Z. The holder of any of paragraphs A-Y, wherein the holder interlock comprises an interlock projection or an interlock recess for engagement with a corresponding interlock tongue or interlock recess of a headpiece only when the holder is assembled in the correct alignment configuration.

AA. The holder of any of paragraphs A-Z, wherein the interlock projection comprises an interlock tongue.

BB. The holder of any of paragraphs A-AA, wherein the interlock recess comprises an interlock groove.

CC. The holder of any of paragraphs A-BB, wherein the interlock tongue or the interlock recess is disposed in or on the base portion of the holder.

DD. An embrasure sweep for assembly to a headpiece of a handle, the embrasure sweep comprising: a base portion; a pair of jaws, spaced apart from the other, and extending from the base portion to accommodate a length of dental floss therebetween, the jaws of the embrasure sweep extending to embrace a headpiece of a handle therebetween in a correct alignment configuration of the embrasure sweep with respect to a handle in use, the embrasure sweep having a holder interlock to substantially prevent engagement of the holder with a headpiece except when the holder is in a correct alignment configuration; and an embrasure member disposed on an end of a first jaw of the pair of jaws, the end distal to the base portion, and projecting towards a second jaw of the pair of jaws, the embrasure member comprising: an embrasure base disposed against the end of the first jaw; an embrasure tip spaced from the embrasure base; and an embrasure surface joining the embrasure base to the embrasure tip, the embrasure surface configured to clean or stimulate a tooth surface or a gum surface.

EE. The embrasure sweep of any of paragraphs A-DD, wherein the embrasure surface comprises bristles or ridges.

FF. The embrasure sweep of any of paragraphs A-EE, wherein the embrasure surface comprises a tapered surface.

HH. The embrasure sweep of any of paragraphs A-FF, wherein the tapered surface comprises multiple tapers or multiple disparate tapers.

II. The embrasure sweep of any of paragraphs A-HH, wherein the dental floss extends from the embrasure tip of the first jaw to an embrasure tip of the second jaw.

While the example clauses described above are described with respect to one particular implementation, it should be understood that, in the context of this document, the content of the example clauses can also be implemented via a method, device, system, computer-readable medium, and/or another implementation. Additionally, any of examples A-II can be implemented alone or in combination with any other one or more of the examples A II.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders.

What is claimed is:

1. A dental hygiene headpiece comprising:

a base having a top surface;

a first arm having a first surface and extending substantially perpendicular to the top surface;

a second arm having a second surface opposing the first surface and extending substantially perpendicular to the top surface;

a filament affixed to the first surface and to the second surface and extending therebetween;

a first cleaning feature disposed on a portion of the first surface and having a plurality of projections; and a second cleaning feature disposed on a portion of the second surface and having a plurality of projections, wherein each of the first arm and the second arm comprises a step taper from a first width at an end proximate to the base portion to a second width at a distal end, and wherein each of the first cleaning feature and the second cleaning feature comprises a substantially pyramidic profile comprising an apex, a concave equilateral hexagonal base on a respective one of the first surface and the second surface, and a plurality of spines each extending from the apex to the base.

2. The dental hygiene headpiece of claim 1, wherein the base further comprises an attachment mechanism.

3. The dental hygiene headpiece of claim 1, wherein the base further comprises a tongue scraper having a plurality of ridges.

4. The dental hygiene headpiece of claim 1, wherein the plurality of projections of each of the first cleaning feature and the second cleaning feature are located along the plurality of spines of the substantially pyramidic profile of each of the first cleaning feature and the second cleaning feature.

* * * * *